United States Patent [19]

Fernandez

[11] E Patent Number: Re. 33,011

[45] Reissued Date of Patent: Aug. 8, 1989

[54] TENNIS RACKET FRAME MADE OF METAL OXIDE FIBERS AND CERAMIC PARTICLES

[76] Inventor: David Fernandez, 1457 Dara St., Camarillo, Calif. 93010

[21] Appl. No.: 943,560

[22] Filed: Feb. 17, 1987

Related U.S. Patent Documents

Reissue of:

[64] Patent No.: 4,614,341
Issued: Sep. 30, 1986
Appl. No.: 632,453
Filed: Jul. 19, 1984

[51] Int. Cl.[4] ..... A63B 49/10

[52] U.S. Cl. ..... 273/73 C; 273/73 G; 273/DIG. 23; 273/DIG. 7; 273/DIG. 3; 273/DIG. 6

[58] Field of Search ..... 273/73 D, 73 F, 73 G, 273/73 C, DIG. 6, DIG. 7, DIG. 23, DIG. 29, DIG. 32; 264/275, 466, 469, 15; 428/329, 331; 51/309; 501/95, 127

[56] References Cited

U.S. PATENT DOCUMENTS

| | | | |
|---|---|---|---|
| D. 230,753 | 3/1974 | Vaughn et al. | 273/73 D X |
| D. 235,892 | 7/1975 | Altissimo | 273/73 G X |
| D. 256,823 | 2/1978 | James . | |
| D. 257,163 | 8/1978 | Lo | D21/212 |
| 257,483 | 11/1880 | Drake | D21/212 |
| 472,659 | 4/1892 | Malings | D21/212 X |
| 801,246 | 10/1905 | Johnson . | |
| 1,460,665 | 7/1913 | Gallaudet . | |
| 1,563,255 | 10/1922 | Beal . | |
| 1,563,352 | 12/1922 | Fisher . | |
| 1,684,449 | 9/1928 | Kleinman . | |
| 2,171,223 | 8/1939 | Robinson . | |
| 2,878,020 | 3/1959 | Robinson . | |
| 3,582,072 | 6/1971 | Stueck | 273/73 C |
| 3,582,073 | 6/1971 | Melnick et al. | 273/73 H |
| 3,598,693 | 8/1971 | Andersen et al. | 273/DIG. 32 |
| 3,690,658 | 9/1972 | Howe | 273/DIG. 3 X |
| 3,702,701 | 11/1972 | Vaughn et al. | 273/73 D X |
| 3,876,579 | 4/1975 | Hallstrom et al. | 523/457 |
| 3,990,701 | 11/1976 | Kim | 273/73 D X |
| 4,092,296 | 5/1978 | Skiff | 521/103 X |
| 4,134,759 | 1/1979 | Yajima et al. | 423/345 |
| 4,141,551 | 4/1979 | Goransson | 273/73 G |
| 4,162,900 | 7/1979 | Judd | 428/329 |
| 4,194,738 | 3/1980 | Inoue et al. | 273/73 C |
| 4,221,697 | 9/1980 | Osborn et al. | 428/331 |
| 4,282,642 | 8/1981 | Rodgers | 273/73 H X |
| 4,299,348 | 11/1981 | Fukumoto | 273/73 H X |
| 4,342,712 | 8/1982 | Yajima et al. | 423/345 |
| 4,413,822 | 11/1983 | Fernandez et al. | 273/73 C |

FOREIGN PATENT DOCUMENTS

| | | | |
|---|---|---|---|
| 122823 | 11/1946 | Australia | 273/73 H |
| 736167 | 9/1932 | France . | |
| 2195163 | 8/1972 | France . | |
| 2455906 | 1/1981 | France | 273/73 D |
| 217272 | 2/1923 | United Kingdom . | |
| 2103667 | 2/1983 | United Kingdom | 273/73 C |

*Primary Examiner*—Edward M. Coven
*Assistant Examiner*—William E. Stoll
*Attorney, Agent, or Firm*—Poms, Smith, Lande & Rose

[57] ABSTRACT

Improved tennis racket in which an inverted chevron shaped yoke is provided having downward sloping side portions which match the curvature of the arcuate top portion of the racket head to provide vertical strings extending between the yoke and arcuate top portion which are of the same length. The equal length of vertical strings provide uniform elastic response to ball impact. The particular design of the chevron provides added structural strength to the neck of the racket. An improved racket made from a polycrystalline metal oxide fiber and resin matrix is also disclosed. In addition, an improved string protection system involving elastomer inserts which are molded into the head portion of composite material rackets is described.

12 Claims, 2 Drawing Sheets

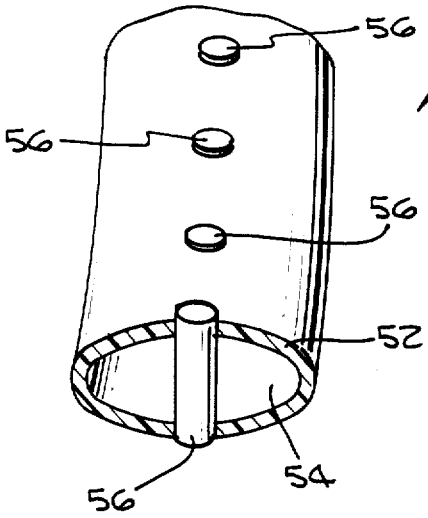
Fig. 6.
Fig. 8.
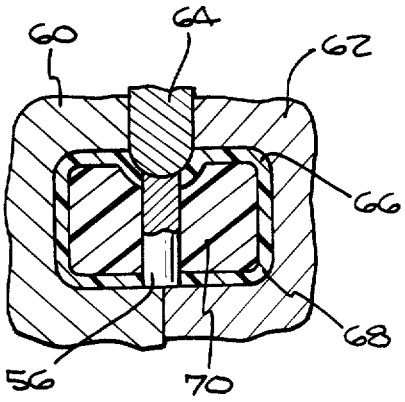
Fig. 7.
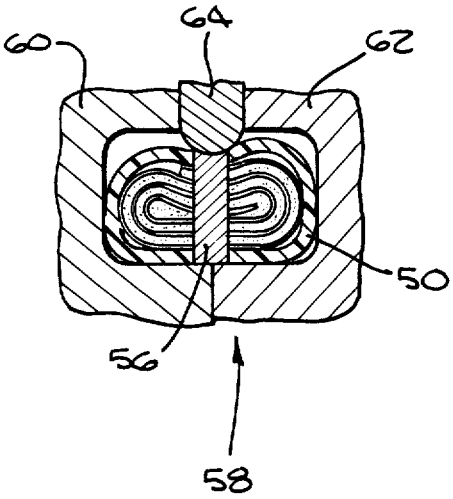
Fig. 9.
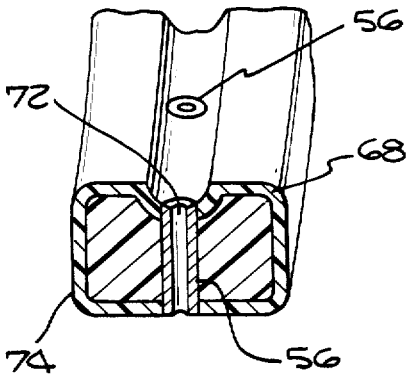

TENNIS RACKET FRAME MADE OF METAL OXIDE FIBERS AND CERAMIC PARTICLES

Matter enclosed in heavy brackets [ ] appears in the original patent but forms no part of this reissue specification; matter printed in italics indicates the additions made by reissue.

BACKGROUND OF THE INVENTION

The present invention relates generally to tennis rackets—their design, construction and manufacture. More particularly, the present invention relates to an improved tennis racket having a head portion shaped for optimum performance and an improved string mounting system. The present invention also relates generally to materials and methods for making composite material tennis rackets. More particularly, the present invention relates to a tennis racket frame made from ceramic fiber composite materials which exhibit increased durability and wear resistance while still providing a racket frame which is lightweight, strong and flexible.

Tennis rackets basically include a head portion, a handle and a neck portion which connects the handle to the head. In general, one or more structural supports or yokes are provided which extend across the neck portion in order to strengthen the racket and provide a location for strings to be mounted at the bottom of the racket head. Numerous different head designs have been proposed in the past to provide a racket with optimum performance characteristics. It usually is desirable to provide a racket which has as large a "sweet spot" as possible. The "sweet spot" of a racket is that area of the racket head which when contacted by the ball during the tennis swing provides optimum reproducible and controllable hitting by the player. It would be desirable to provide a tennis racket head which increases the size of the sweet spot present in the racket head. It would also be desirable to provide a yoke structure extending across the racket neck which increase the strength and structural integrity of the racket neck.

Another important consideration in designing a tennis racket frame is the particular material utilized in fabricating the racket. Wood and metal racket frames have been in common use for many years. More recently, racket frames made from composite materials such as resin impregnated graphites, glass and boron fibers have become available. Composite material rackets made from graphite fibers have been particularly popular due to their high strength and light weight. One problem with graphite rackets is that they tend to be easily abraded when struck against the tennis court or other hard surfaces. It would be desirable to provide a composite material racket having the desirable light weight and structural strength of graphite while being more durable and resistant to abrasion. Graphite rackets also tend to be very rigid and inflexible. In general, a certain amount of racket flexing is desired during and after ball contact. It would be desirable to provide a composite material racket which is more flexible than graphite fiber rackets.

As is well known, composite material rackets are generally made by forming uncured, resin impregnated fibers into a tennis frame precursor and then curing the composite material to form the finished tennis racket frame. In the head portion of the tennis racket, string holes must be provided for mounting the tennis strings. In general, the string holes are molded as part of the frame or drilled into the tennis frame after curing. Protective grommets or a protective grommet strip is the positioned around the head portion to protect the strings as they pass through the string holes from abrasion, cutting and breakage. It would be desirable to provide a tennis racket structure in which some other means for protecting the tennis strings is provided other than the individual grommets or grommet strips presently in use.

It is an object of the present invention to disclose and provide a tennis racket which is made from a composite material which provides equal or better performance characteristics than graphite composite rackets while providing increased durability and abrasion resistance.

An additional object of the present invention is to disclose and provide a tennis racket having a head portion with an improved string mounting configuration which is easily manufactured and provides optimum protection of the tennis strings at the point of contact with the tennis frame.

SUMMARY OF THE INVENTION

The present invention is an improvement upon a tennis racket frame having a head, a handle and a neck extending between the head and handle. The head of the tennis racket frame has an arcuate top portion and two spaced arcuate side portions extending between the neck and the arcuate top portion of the head. The neck includes two arcuate members which extend between the arcuate side portions of the head and the handle. The neck further includes a yoke extending between the arcuate members of the neck. The arcuate top portion, arcuate side portions, neck and yoke of the tennis racket frame define a ball contact zone across which a plurality of spaced vertical strings and spaced horizontal strings are strung.

A feature of the present invention is the provision of a tennis racket made from polycrystalline metal oxide fibers in a resin matrix. It has been found that polycrystalline metal oxide fibers, such as the socalled ceramic fibers composed of aluminum oxide, boron oxide and silicon dioxide, when combined with a resin matrix selected from the group consisting of silicon, epoxy, phenolic and polyamid resins provide a particularly desirable tennis racket frame material which is lightweight and abrasion resistant.

An additional feature of the present invention involves incorporating ceramic particles such as boron carbide, silicon carbide or titanium carbide into the polycrystalline metal oxide fiber/resin matrix to provide a tennis racket which is especially resistant to abrasion while still being lightweight, flexible, and strong. Further, rackets made from the polycrystalline metal oxide fibers in a resin matrix in accordance with the present invention provide a racket having optimum "feel" and performance characteristics.

As another feature of the present invention, a tennis racket frame made from composite materials is provided in which the string holes are made by molding rod shaped elastomeric inserts into the head portion during curing of the composite material racket frame to provide a cured composite material racket having a plurality of elastomeric or plastic inserts molded therein. The string holes are made by either molding or drilling holes through the elastomeric inserts prior to or after molding into the rachet frame to provide string mounting holes having a molded in plastic protective grommet between the string and the composite material. This provides an especially convenient and effective means for protecting the racket strings from abrasion against the much harder composite material and the resultant premature failure of the strings.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 6 is a perspective view with a partial cross section showing an exemplary precursor composite frame having the elastomeric or plastic string inserts placed therein prior to molding.

FIG. 7 is a sectional view of the partial frame precursor shown in FIG. 6 in position within the curing mold prior to curing.

FIG. 8 is the same view as FIG. 7 showing the cured composite frame inside the mold after curing.

FIG. 9 is a perspective partial sectional view of the completed frame portion showing the string holes in accordance with the present invention.

DETAILED DESCRIPTION OF THE INVENTION

Figure 1:
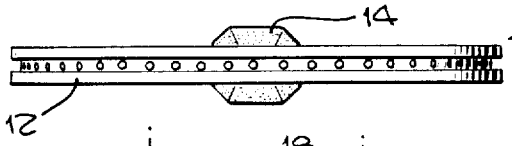
FIG. 1 is a top view of a preferred exemplary racket in accordance with the present invention.
Figure 2:
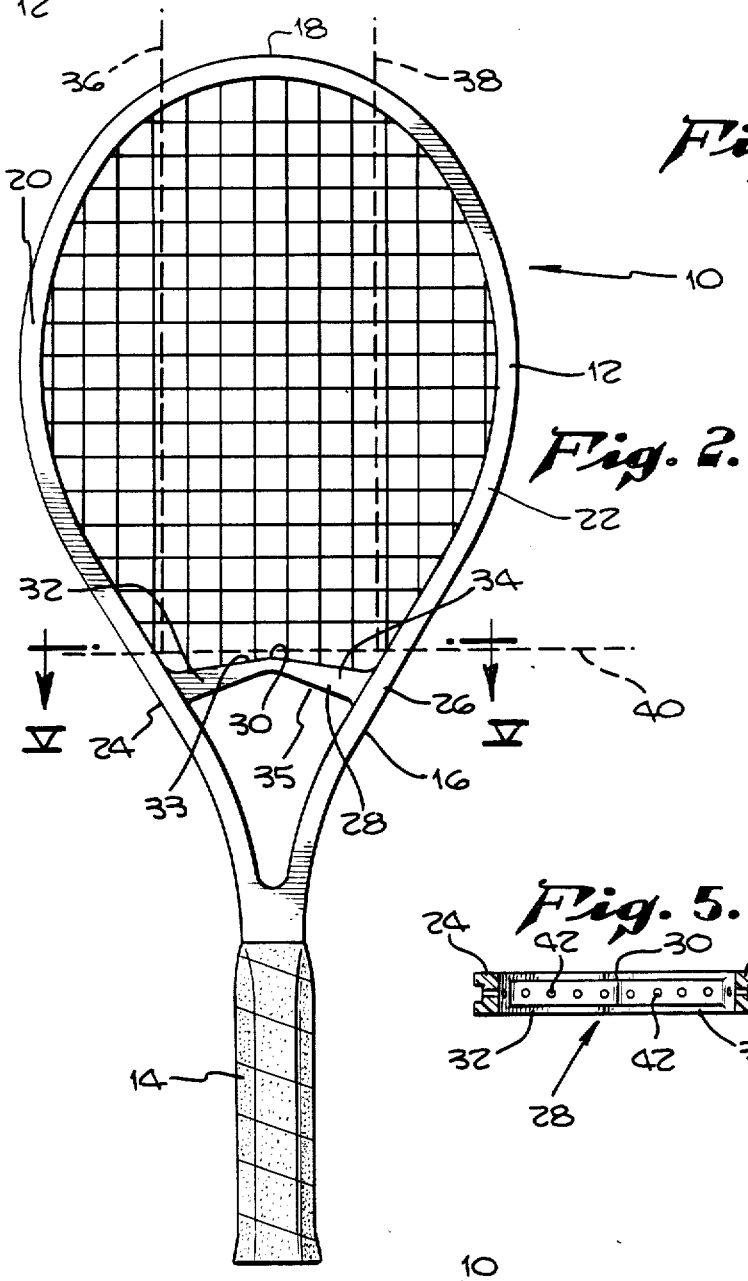
FIG. 2 is a front view of the preferred exemplary racket shown in FIG. 1.
Figure 3:
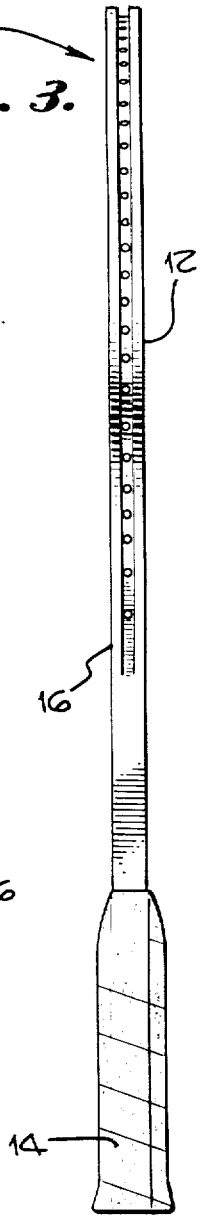
FIG. 3 is a side view of the preferred exemplary racket shown in FIG. 1.

A preferred exemplary tennis racket in accordance with the present invention is shown generally at 10 in FIGS. 1–5. The tennis racket frame 10 includes a head 12, a handle 14 and neck 16 extending between the head 12 and handle 14. The head 12 has an arcuate top portion 18 as best shown in FIG. 2. The head 12 further includes two spaced arcuate side portions 20 and 22 which extend between the neck 16 and arcuate top portion 18 of head 12.

The neck 16 includes two arcuate members 24 and 26 which extend between the arcuate side portions 20 and 22 and the handle 14. A yoke 28 is provided extending between the arcuate side members 24 and 26. The yoke 28 is preferably a chevron having an apex 30 and two side elements 32 and 34 which slope downward and away from the apex 30. Preferably, the cross sectional area of the side elements 32 and 34 increases from the apex 30 towards the point at which the side elements 32 and 34 are connected to side members 24 and 26, respectively.

As a feature of the present invention, the two side elements 32 and 34 should slope downward sufficiently to provide vertical strings of the same length extending between the yoke 28 and top portion 18. The area of uniform length vertical strings is highlighted in FIG. 2 by the vertical phantom lines 36 and 38. The two side elements 32 and 34 may also be sloped downward sufficiently to provide longitudinal strings which increase in length from the apex of the yoke 30 towards the side members 24 and 26.

A chevron shaped yoke 28 is preferred due to its enhanced structural reinforcement features. Especially preferred is a chevron as shown in FIG. 2 where the cross-sectional area of the chevron increases from the apex 30 towards the neck side members 24 and 26. Other chevron shapes are possible so long as the downward slope of the yoke 28 matches or is greater than the curvature of the arcuate top portion 18 so that the vertical strings between phantom lines 36 and 38 are of equal length of gradually increasing length from the apex 30 towards the side members 24 and 26. The equal length vertical strings provide uniform elastic response to ball impact over the area covered by the equal length strings. This is an improvement over conventional rackets in which the length of the vertical strings decreases as one moves from the apex 30 towards the racket sides 24 and 26.

For both structural and performance consideration, it is preferred that the downward sloping elements 32 and 34 slope downward at an angle such that the angle between the side elements 32 and 34 and a horizontal line (shown) at 40 in phantom) is between 10 degrees and 45 degrees. More particularly, it is preferred that the downward slope of top surface 33 of side elements 32 and 34 relative the horizontal line 40 is approximately 20 degrees with the downward slope of the bottom surface 35 being approximately 25 degrees.

Figure 5:
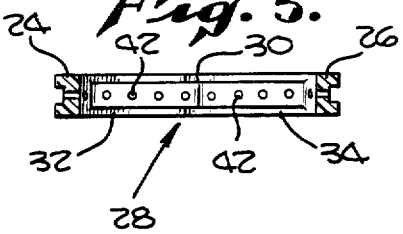
FIG. 5 is a sectional view of FIG. 2 taken in the II—II plane.
Figure 4:
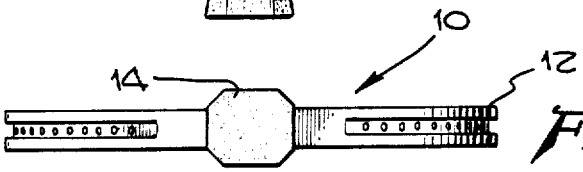
FIG. 4 is a bottom view of the preferred examplary racket shown in FIG. 1.

The inverted chevron shape of the yoke 28 provides the additional advantage of increasing the space between racket string holes 42, as best shown in FIG. 5. A problem experienced with prior art rackets is that the conventional arcuate shape in which the apex of the arc is below the attachment points of the yoke to the neck requires that the string holes be spaced rather close together. The close spacing of the string holes structurally weakens the yoke and may result in premature racket failure. As a particular feature of the inverted chevron yoke design in accordance with the present invention, the string holes in the yoke 28 may be spaced further apart to produce a structurally stronger yoke.

The exemplary tennis racket design shown in FIGS. 1–5 may be made from any suitable material such as wood, metal, resin-impregnated graphite fibers or other composite material such as resin impregnated boron filaments, glass fibers, polyamide fibers (Kevlar) or the like. However, as a particular feature of the present invention it is preferred that the tennis racket frame be made from polycrystalline metal oxide fibers alone or in conjunction with a core of other fibers such as graphite or fiberglass in a resin matrix. The preferred polycrystalline metal oxide fibers include aluminum oxide, boron oxide and silicon dioxide. A particularly preferred fiber composition is a polycrystalline metal oxide fiber which is 52 weight percent aluminum oxide, 14 weight percent boron oxide and 24 weight percent silicon dioxide. This preferred polycrystalline metal oxide fiber is sold as Nextel TM 312 Ceramic Fibers and is available from 3M Corporation, St. Paul. Minn. It is preferred that the polycrystalline metal oxide fibers be present in a resin matrix which includes resins selected from the group consisting of silicon, epoxy, phenolic and polyamide resins. Epoxy resins are preferred. Additionally, it is preferred that ceramic particles such as boron carbide, silicon carbide, aluminum oxide, tungsten carbide and titanium carbide be added to the polycrystalline metal oxide fiber/resin matrix in order to additionally enhance the abrasion resistance and durability of the composite material. The silicon carbide particles are particularly preferred. Particle sizes ranging from 40 microns to 275 microns are suitably incorporated into the ceramic fiber/resin matrix. Processing and curing of the Nextel ceramic fibers is carried out according to conventional composite material fabrication techniques with conventional curing temperatures and pressures being utilized.

A nagging problem with both composite material and metal tennis rackets is that plastic grommets must be inserted into the string holes after final fabrication of the racket frame is completed in order to prevent strings from being cut and broken by the racket frame. In accordance with the present invention, a method is provided for incorporating a protective material into the racket frame during fabrication to provide a protective insert which replaces the grommets and grommet strips commonly found in both metal and composite material tennis rackets. The string protection inserts as described below may be used in conjunction with composite rackets made from resin impregnated graphite and other composite materials such as resin impregnated boron filaments, glass fibers, Kevlar, and the ceramic fiber/resin matrix described above.

FIG. 6 is a partial perspective/sectional view of a head portion 50 of a tennis racket frame prior to curing. The uncured frame section precursor 50 includes resin impregnated fibers 52, blowing agent and core material 54 and the elastomeric inserts 56. Fabrication of rackets in general utilizing a composite material shell 52 and central core 54 with blowing agent is well known. A particularly preferred process is disclosed in U.S. Pat. No. 4,413,822, which is assigned to American Sports Equipment, Camarillo, Calif. The contents of this patent are hereby incorporated by reference.

The insert 56 is preferably made from an elastomeric or plastic material such as nylon or similar plastics. The plastic must be stable at the temperatures which are usually used to cure various composite materials. Further, the plastic should be sufficiently strong and resilient to provide protection of the racket string from the harder composite materials while not being so soft that it is easily worn or abraded by the racket strings. As shown in FIG. 6, it is preferred that the inserts 56 extend above and below the outer perimeter of the frame precursor 50. This is to insure that when the frame precursor is placed in the mold, the resin matrix cannot flow over the top or bottom of insert 56. As a particular requirement, the cross section of the rod shaped insert 56 must be larger than the string hole. Preferably, the insert 56 will have a diameter of about ¼" to ⅜". The string holes can be molded into the insert during formation of the insert prior to or during molding of the frame or the string holes can be drilled through the inserts prior to or after molding of the frame. The string holes are preferably in the center of the insert and are around ⅛" in diameter. This will leave a molded in grommet of plastic material between the string and frame as will be discussed below.

As shown in FIG. 7, the frame precursor 50 along with plastic inserts 56 is placed in a suitable mold shown generally at 58. The mold 58 includes left half 60, right half 62 and center piece 64. As previously mentioned, the extension of the ends of insert 56 above and below frame precursor 50 is important so that the resin matrix does not seep between the ends of the mold and the insert 56 during molding. This is important since a thin film of resin matrix covering the ends of insert 56 would produce a sharp edge which would cut the racket strings when the racket is strung.

The frame precursor 50 is heated to the desired curing temperature and maintained there for a sufficient time in accordance with conventional composite material curing techniques to form the cured racket frame 66 as shown in FIG. 8. The cured frame 66 includes the cured composite shell 68, central foam core 70 and a plurality of elastomeric inserts 56.

As the final step in preparing the frame structure for stringing, holes 72 are preferably drilled through inserts 56. As previously mentioned, the holes 72 may be preformed in the inserts prior to molding of the racket frame, if desired. As can be seen from FIG. 9, the diameter of insert 56 is sufficiently large so that the string which is passed through string hole 72 is protected from direct contact with the composite shell 68 by way of the molded-in insert 56. The provision of molding the insert 56 into the cured racket frame 74 provides a permanent and secure string protective mechanism which is an improvement over grommets and grommet strips which are added to the tennis racket after preparation of the frame. The molded in configuration of the insert 56 also provides an aesthetically pleasing look and finish to the racket frame not possible with grommets and/or grommet strips.

As another feature of the present racket frame, discrete masses of high density material, such as tungsten, lead or dense metal, may be positioned within the foam core at various locations around the racket frame. The strategic placement of these high density inserts into the racket frame provide for control of racket balance and precise location of the center of gravity. The inserts are preferably incorporated into the foam core precursor and molded in place during molding of the racket structure.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but are only limited by the following claims.

What is claimed is:

1. A method for making a [tennis] racket frame having a head portion adapted for mounting a plurality of [tennis] strings, said method comprising the steps of:

preparing a [tennis] frame precursor from uncured composite material, said frame precursor having a head portion;

placing string inserts at spaced locations around said frame precursor head portion, said string inserts being rod shaped and extending perpendicularly through said frame precursor, said inserts having a cross-sectional area which is larger than the cross-sectional area of the [tennis] strings and being softer than the cured composite material;

curing said [tennis frame] precursor with said inserts located therein for a sufficient time and at a sufficient temperature to form a composite [tennis] racket frame having a head portion with said string inserts molded therein;

forming holes in said inserts of sufficient size for said [tennis] strings to pass therethrough for mounting, said holes being sufficiently small so that said [tennis] strings are surrounded by said inserts when said strings are mounted within the formed holes.

2. A method according to claim 1 wherein said rod shaped insert is selected from the group consisting of a plastic and an elastomer.

3. A method according to claim 2 wherein said plastic is nylon.

4. In a method for making a composite material [tennis] racket having a head portion and plastic inserts located therein with a hole passing through each insert for mounting a plurality of [tennis] strings, wherein the improvement comprises:

molding said plastic inserts into said head portion during curing of said composite material racket frame to provide a cured composite material racket frame having a plurality of plastic inserts therein; and forming holes through said molded in [elastomerc] *elastomeric* inserts to provide string mounting holes having a molded in plastic protective grommet between the string and said composite material frame through which said string is mounted to said head portion.

5. A [tennis] racket frame comprising a head portion, a handle portion and a neck portion extending between said head and handle portions and wherein said head portion is adapted to be strung; said frame comprising a shell comprising polycrystalline metal oxide fibers in a resin matrix wherein each of said metal [and] oxide fibers consists essentially of aluminum oxide, boron oxide and silicon dioxide.

6. A [tennis] racket according to claim 5 wherein said polycrystalline metal oxide fibers are 62 weight percent aluminum oxide, 14 weight percent boron oxide and 24 weight percent silicon dioxide.

7. A [tennis] racket according to claim 5 wherein said resin matrix is selected from the group consisting of [silicon] *silicone*, epoxy, phenolic and polyamide resins.

8. A [tennis] racket according to claim 7 wherein said resin matrix is epoxy.

9. A [tennis] racket according to claim 5 wherein said resin matrix includes ceramic particles selected from the group of particles consisting of boron carbide, silicon carbide, aluminum oxide, tungsten carbide and titanium carbide.

10. A [tennis] racket according to claim 9 wherein said ceramic particles have particle sizes of between 40 microns and 275 microns.

11. A [tennis] racket frame according to claim 5 wherein said frame further includes a foam core which is surrounded by said shell.

12. A [tennis] racket frame according to claim 5 wherein said shell further includes graphite fibers or glass fibers in said resin matrix.

* * * * *